C. E. DERR.
GEAR.
APPLICATION FILED OCT. 22, 1914.
1,141,043.
Patented May 25, 1915.
2 SHEETS—SHEET 1.
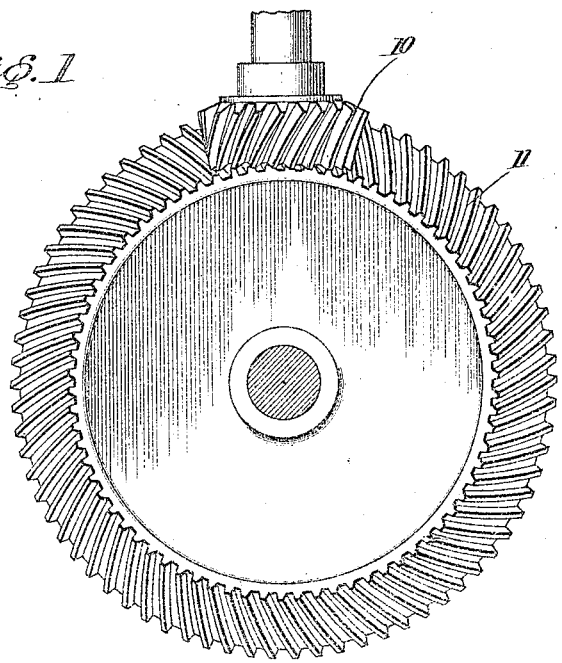
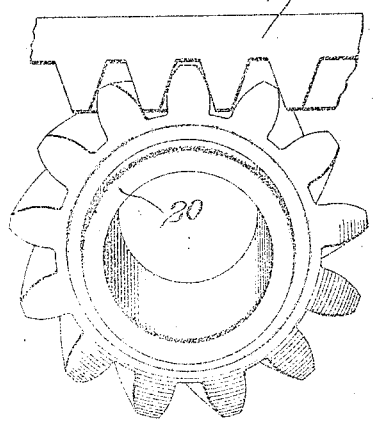
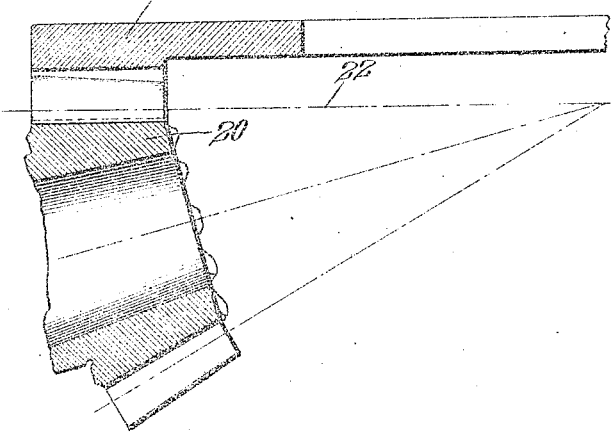
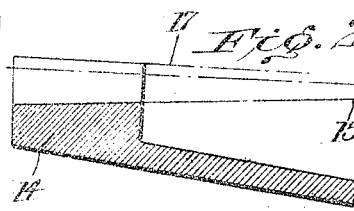

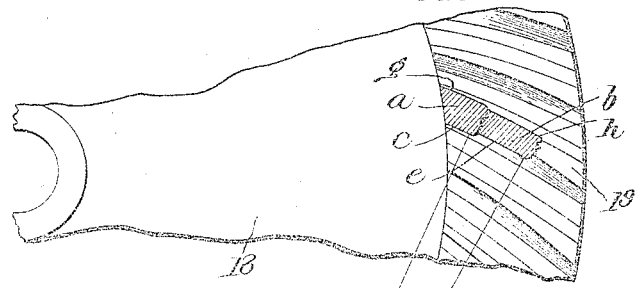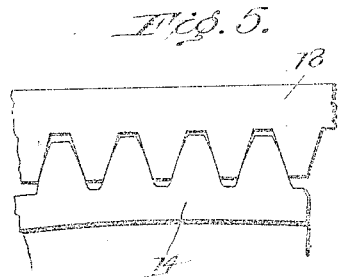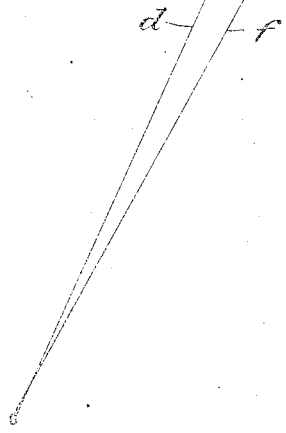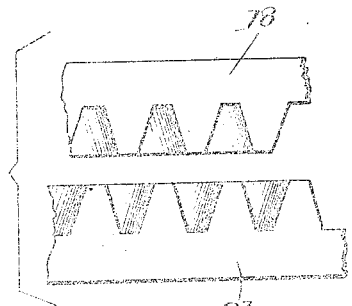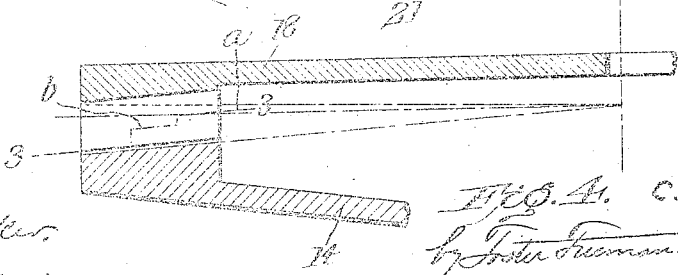

UNITED STATES PATENT OFFICE.

CHARLES E. DERR, OF DETROIT, MICHIGAN, ASSIGNOR TO PACKARD MOTOR CAR COMPANY, OF DETROIT, MICHIGAN, A CORPORATION OF MICHIGAN.

GEAR.

1,141,043.      Specification of Letters Patent.      Patented May 25, 1915.

Original application filed October 11, 1912, Serial No. 725,328. Divided and this application filed October 22, 1914. Serial No. 868,085.

*To all whom it may concern:*

Be it known that I, CHARLES E. DERR, a citizen of the United States, residing at Detroit, Wayne county, State of Michigan, have invented certain new and useful Improvements in Gears, of which the following is a specification.

This application is a division of my application Serial No. 725,328, filed October 11, 1912, which discloses and claims a method and machine for cutting bevel gears having certain characteristics. The present application relates to the gears themselves.

The object of the invention is to obtain a gear or pair of gears that will operate quietly and that may be cut on the "principle of evolution", as described in Letters Patent No. 294,844. This principle of cutting gears involves the theory that any number of gear wheels which correctly gear with a rack having teeth the shape of a truncated V will correctly gear with one another. In the case of bevel gears the rack is of course a circular one. The rule, however, is subject to the exception that if the pitch circle of one of a pair of gears to be cut is nearer the bottom than the top of the tooth, that is, if the teeth of such gear have a long addendum and short dedendum, or if the teeth of one of such gears are thicker than those of the other, then the other gear of the pair will not gear with the same rack but with a rack of reverse form, that is, in which the teeth have the form of the spaces of the first rack and the spaces the form of the teeth thereof.

Referring to the drawings, which form a part of the specification, Figure 1 is a plan view of a pair of gears embodying the invention; Fig. 2 is a side view of a tool and a section of the large gear blank, illustrating their relative positions and diagrammatically showing the path of travel of the tool relatively to the blank; Fig. 3 is a plan of a segment of a crown gear having teeth which are conjugate to the teeth of the large gear shown in Fig. 1, one of the teeth of the crown gear being sectioned on line 3—3 of Fig. 4; Fig. 4 is a section of the crown wheel shown in Fig. 3, and an intermeshing bevel wheel; Fig. 5 is a side view of parts shown in Fig. 4; Fig. 6 is a section of the pinion shown in Fig. 1 and the crown wheel which meshes therewith; Fig. 7 is a side view of the parts shown in Fig. 6; and Fig. 8 is an edge view of portions of the crown wheels shown in Figs. 4 to 7.

The gears illustrated herein are particularly adapted for use in motor vehicle axles and they comprise a bevel driving pinion 10 and a comparatively large driven gear wheel 11, the axes of which are arranged at right angles to each other and in the same plane. In the pinion the addendum of the teeth is long and the dedendum short, while the reverse is true of the gear. In both, the teeth are diagonally arranged with reference to elements of the pitch cones, intersecting them and are curved in the direction of their length, as clearly shown in Fig. 1. These teeth are cut by a novel method on special machines in which the blank is rolled as the tool or cutter, of rack tooth or truncated V form, moves through the blank in a curved path. Such a method and machine are shown and described in my said application Serial No. 725,328. In cutting these gears, the path of the tool is parallel to a plane substantially tangential to the gear, or, specifically in the bevel gears shown, it is parallel to the dedendum cone of the gear being cut, and the cutting edge of the tool describes a surface which conforms to one of the side faces of a tooth of a circular rack or crown wheel, the teeth of which are of truncated V form and curved lengthwise. This forms a bevel gear that would of course gear with such circular rack and the teeth of such gear would also extend in a generally diagonal direction and be curved in the direction of their length.

In the drawings, 12 represents the tool or cutter, the cutting edge 13 of which is one side of a rack tooth of truncated V form, and 14 is a blank for a bevel gear. But one edge of the tool 12 is used and therefore only one side of one tooth is cut as the tool is operated, the tool moving parallel to a plane containing the broken line 15, which is the line of movement of the lowest part of the tool 12. This plane, it will be seen, is always tangential to the dedendum cone of the blank and passes through the apex of said cone. A line 16, representing an element of the pitch surface of the gear, is indicated in Fig. 2, also a similar line 17 on the addendum cone. The path of the tool is in a generally diagonal direction with reference to elements of the pitch cone of the gear which intersect it, and is curved on the arc of a true circle. When the movement of the tool is translatory, as in the particular machine shown in my said application Serial No. 725,328, the different points on the cutting edge 13 of the tool will move about different but parallel axes, the radius, however, in each case being the same.

In making the finishing cuts on bevel gears the teeth on opposite sides of the tooth spaces are operated on separately, separate settings of the tool being made to cut on opposite sides in order to obtain the required taper to the tooth and space. Bearing this in mind it will be seen that it is sufficient to describe one of the faces of the gear tooth and the other will be understood to be the same except that it will be at a slightly different angle due to the conical shape of the gear.

From the foregoing description it will be evident that the cutting edge 13 of the tool describes a surface such as is generated by the motion of a straight line guided by true circular arcs which lie in planes parallel to a plane tangential to the dedendum cone of the gear.

In order to generate the curved faces of the teeth the blank is rolled on its pitch surface simultaneously with the cutting movements of the tool 12. The resulting face of the tooth is, therefore, a surface which is conjugate to the surface described by the cutting edge 13 of the tool and since the tool is in the form of a rack tooth the surface described by the cutting edge 13 corresponds to the faces of the teeth of a rack which will mesh with the gear being cut. Such a rack 18, which in the present instance is a crown wheel, is illustrated in Figs. 3, 4 and 5 and in Figs. 4 and 5 the gear 14 is shown in mesh therewith. The tooth 19 of the crown wheel is cut away at $a$ and $b$ on planes which are parallel to a plane tangential to the dedendum cone of the gear 14. The intersection of the surface $a$ with one face of the tooth 19 is the circular arc $c$ having the radius $d$ and the intersection of the surface $b$ with the same face of the tooth is the circular arc $e$ having the radius $f$. The face of the tooth is a surface generated by a straight line having a translatory movement and guided by the arcs $c$ and $e$. The opposite face of the tooth 19 is a surface generated by a line having a translatory movement and guided by the arcs $g$ and $h$.

In Figs. 6 and 7 I have illustrated a pinion 20 which is a mate for the gear 14, this pinion being shown in mesh with the crown wheel 21. The line 22 represents an element of the pitch cone of the pinion 20 and it will be evident from the location of this line that the pinion has a long addendum and a short dedendum. As shown in Fig. 4, the gear 14 has a correspondingly short addendum and long dedendum and hence the rack or crown wheel 21 will have teeth the form of the spaces between the teeth of the crown wheel 18, the teeth of the wheel 18 having the form of the spaces between the teeth of the wheel 21. (See Fig. 8.)

It will be understood that various modifications of the specific embodiment of the invention herein illustrated may be made without departing from the spirit or scope of the invention, which is defined in the appended claims.

Having thus described the invention, what is claimed and desired to be secured by Letters Patent is:

1. A bevel gear having teeth extending in a generally diagonal direction with reference to elements of the pitch cone, which intersect therewith, and curved in the direction of their length, the faces of the teeth being conjugate to surfaces each of which is generated by the motion of a straight line guided by true circular arcs lying in planes parallel to a plane tangential to the dedendum cone of the gear.

2. A bevel gear having teeth extending in a generally diagonal direction with reference to elements of the pitch cone, which intersects therewith, and curved in the direction of their length, the faces of the teeth being conjugate to surfaces each of which is generated by the translatory motion of a straight line guided by a true circular arc lying in a plane tangential to the dedendum cone of the gear.

3. A pair of bevel gears comprising a pinion having cut teeth extending in a generally diagonal direction with reference to elements of the pitch cone, which intersect therewith, and curved in the direction of their length, each of the side faces of the teeth being conjugate to one of the sides of a meshing crown wheel tooth having the form of a truncated V with sides curved lengthwise on arcs of true circles, and a gear wheel having its axis arranged at right angles to and in the same plane with the axis of said pinion and having cut teeth adapted to mesh with the teeth of said pinion, each of the side faces of said gear wheel teeth being conjugate to one of the sides of a meshing crown wheel tooth having the form of the space between two of the teeth of said first mentioned crown wheel.

In testimony whereof I affix my signature in presence of two witnesses.

CHARLES E. DERR.

Witnesses:
 CLAIR S. COTE,
 LE ROI J. WILLIAMS.

Correction in Letters Patent No. 1,141,043.

It is hereby certified that in Letters Patent No. 1,141,043, granted May 25, 1915, upon the application of Charles E. Derr, of Detroit, Michigan, for an improvement in "Gears," an error appears in the printed specification requiring correction as follows: Page 2, line 95, for the syllable "sects" read *sect;* and that the said Letters Patent should be read with this correction therein that the same may conform to the record of the case in the Patent Office.

Signed and sealed this 15th day of June, A. D., 1915.

[SEAL.]

J. T. NEWTON,
*Acting Commissioner of Patents.*